(12) United States Patent
Harvey

(10) Patent No.: US 6,834,483 B2
(45) Date of Patent: Dec. 28, 2004

(54) METHOD OF HARVESTING SUGARCANE

(76) Inventor: John P. Harvey, 562 Leonard St., Spring Lake, MI (US) 49456

( * ) Notice: Subject to any disclaimer, the term of this patent is extended or adjusted under 35 U.S.C. 154(b) by 0 days.

(21) Appl. No.: 10/381,065

(22) PCT Filed: Oct. 9, 2001

(86) PCT No.: PCT/US01/31549
§ 371 (c)(1),
(2), (4) Date: Mar. 19, 2003

(87) PCT Pub. No.: WO02/32211
PCT Pub. Date: Apr. 25, 2002

(65) Prior Publication Data
US 2003/0205040 A1 Nov. 6, 2003

(51) Int. Cl.[7] .................................. A01D 69/00
(52) U.S. Cl. ............................................. 56/1
(58) Field of Search ................ 219/121.67, 121.74, 219/121.78; 372/55–60; 47/1.3, 1.44; 56/500, 121.43, DIG. 2, 10.2 R, 10.2 E, 10.2 F, 10.2 D–119, DIG. 7, DIG. 15

(56) References Cited

U.S. PATENT DOCUMENTS

| | | | |
|---|---|---|---|
| 4,408,441 A | 10/1983 | Willett | 56/14.3 |
| 4,609,318 A | 9/1986 | Rodrigue et al. | 414/132 |
| 4,878,341 A | 11/1989 | Giardina et al. | 56/364 |
| 4,962,637 A | 10/1990 | Giardina et al. | 56/344 |
| 5,092,110 A | 3/1992 | Dommert et al. | 56/12.8 |
| 5,138,819 A | 8/1992 | André | 56/10.2 |
| 5,235,798 A | 8/1993 | Giardina et al. | 56/16.6 |
| 5,622,034 A | 4/1997 | Dommert | 56/11.7 |
| 5,953,891 A | 9/1999 | Leigers et al. | 56/16.6 |
| 6,101,795 A | 8/2000 | Diekhans | 56/10.2 F |
| 6,105,699 A | 8/2000 | Hinds | 180/89.14 |
| 6,269,617 B1 | 8/2001 | Blanchard | 56/1 |
| 6,374,584 B1 * | 4/2002 | Blanchard | 56/1 |

OTHER PUBLICATIONS

Newspaper article entitled "Mower uses laser for luxury cut," publication date unknown.

* cited by examiner

Primary Examiner—Robert E Pezzuto
(74) Attorney, Agent, or Firm—Van Dyke, Gardner, Linn & Burkhart, LLP

(57) ABSTRACT

A method of harvesting a stalk-based plant (P), such as sugarcane, includes generating at least one laser beam (b) and causing the at least one laser beam (b) to at least momentarily come into contact with the sugarcane stalk (P). This severs the stalk (P) and cauterizes the stalk (P) where severed.

39 Claims, 2 Drawing Sheets

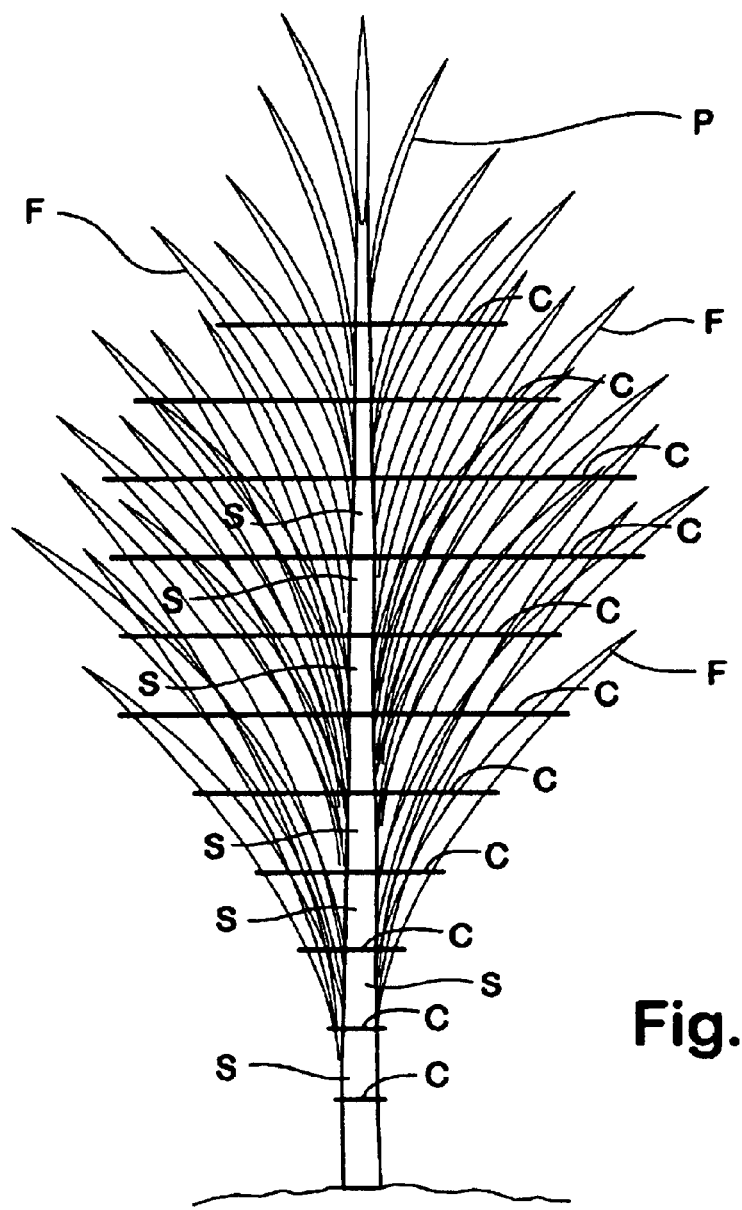
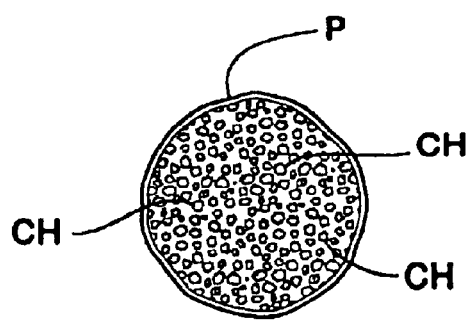
Fig. 3
Fig. 4
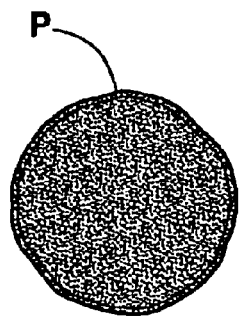
Fig. 5

METHOD OF HARVESTING SUGARCANE

BACKGROUND OF THE INVENTION

This invention relates generally to a method of harvesting sugarcane and a combine that is useful for harvesting sugarcane. Although the invention is especially useful for harvesting sugarcane, it may be used to harvest other food-producing plants, such as corn, or as a bush hog to clear fields of stalk-like growth.

Sugarcane has been harvested manually until recently. As available labor decreases in supply, mechanical combines, or harvesters, have been introduced to automate the harvesting process. The known mechanical combines utilize knives supported by a vehicle which is propelled by caterpillars or treads. The mechanical combine cuts the entire stalk close to the ground and cuts the stalk into lengths of approximately 18 inches or more and ships the stalks to a processing plant. The processing plant removes the foliage which is shipped back to the field for reintroduction to the soil as fertilizer.

Such known mechanical combines have numerous disadvantages. Because the stalk tends to weep at the cut, it is necessary to maintain the length of the stalk as long as possible in order to avoid excessive loss of glucose. Also, bacteria in soil tend to enter the stalk at the cut and cause a process within the stalk that tends to reduce sugar production. This necessitates rapid processing of the cane before the bacteria-based process further reduces yield.

Another difficulty with existing harvesting techniques is the burning of the foliage. This is done to expose the base of the stalk to allow the combine operator to view the stalk/soil interface, as well as to dispose of the foliage. The burning of foliage has become a health hazard not only to the farm workers and local residents, but also to vehicles traveling local highways that may have difficulty seeing because of the smoke density. This has led to an outlawing of burning in some areas where sugarcane is grown.

Additionally, handling of the foliage waste is a significant cost of the process. The foliage waste must be physically removed from the stalk at the processing plant and shipped back to the field for reintroduction to the soil. All of this adds cost to the process. Indeed, it is estimated that up to 75 percent of the hauling cost associated with harvesting sugarcane with a mechanical combine is in handling the foliage.

SUMMARY OF THE INVENTION

The present invention provides a method of harvesting sugarcane in a manner that reduces difficulties created by traditional mechanical harvesting of sugarcane stalks. In particular, the present invention significantly reduces the loss of glucose from the weeping at the harvesting cut. It also significantly reduces the entrance of bacteria at the cut, thereby increasing sugar yield. Moreover, because the present invention reduces weeping and bacteria contamination, it allows the stalk to be cut into smaller sections. This allows the bulk of the foliage to be removed as part of the harvesting process because the foliage naturally is removed from a stalk cut into small sections.

A method of harvesting sugarcane having a stalk, according to an aspect of the invention, includes generating at least one laser beam and causing at least one laser beam to at least momentarily come into contact with the sugarcane thereby severing the stalk and substantially cauterizing the stalk where severed. Among the many advantages that are provided, this substantially reduces loss of glucose and contamination of the glucose with bacteria from the soil.

The laser beam may be scanned across the sugarcane stalk, such as approximately a diameter of a sugarcane's stalk. The sugarcane may be cut into a plurality of sections. A fluid may be flowed past the sections to remove foliage waste. The sections may be tumbled to assist in removing the foliage waste. The sugarcane stalk may be cut into a plurality of sections that are less than one foot in length and may be less than one-half of a foot in length.

The at least one laser beam may be focused at a distance of less than one foot and may be focused at a distance of four inches or less. The distance of the at least one laser beam from the ground may be controlled, such as by sensing the ground with a non-contact sensor. A non-contact sensor may be a laser sensor, an ultrasonic sensor, and/or a radar sensor.

The at least one laser beam may be generated by a laser beam source. The laser beam source may be supported with a vehicle having pneumatic tires. The laser beam source may be supported with a vehicle having an electrical generator for powering the at least one laser source.

An agricultural combine apparatus, or harvester, according to another aspect of the invention, may include at least one laser projecting a laser beam and a support. The support supports the at least one laser to position the beam to intersect a stalk of a plant.

These and other objects, advantages and features of this invention will become apparent upon review of the following specification in conjunction with the drawings.

BRIEF DESCRIPTION OF THE DRAWINGS

FIG. 3 illustrates the cuts applied to the sugarcane, according to the invention;

FIG. 4 illustrates a cross-section of a sugarcane cut, according to the prior art; and FIG. 5 illustrates a cross-section of a sugarcane cauterized, according to the invention.

DESCRIPTION OF THE PREFERRED EMBODIMENT

Figure 1:
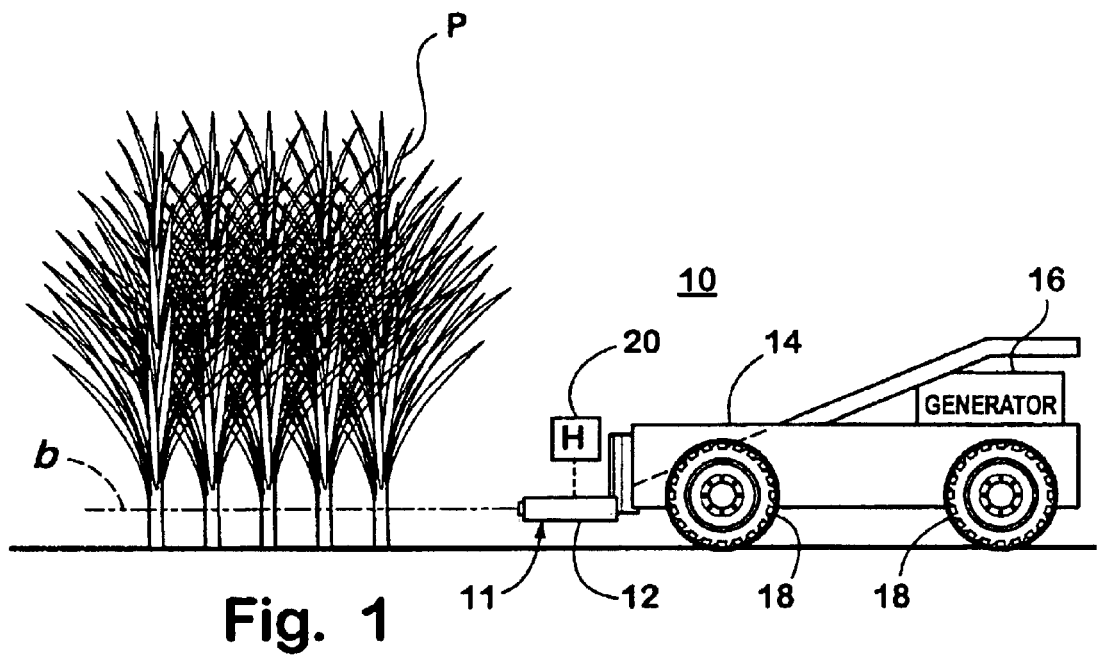
FIG. 1 is a side elevation of a combine and a method of harvesting a plant having a stalk, according to the invention.
Figure 2:
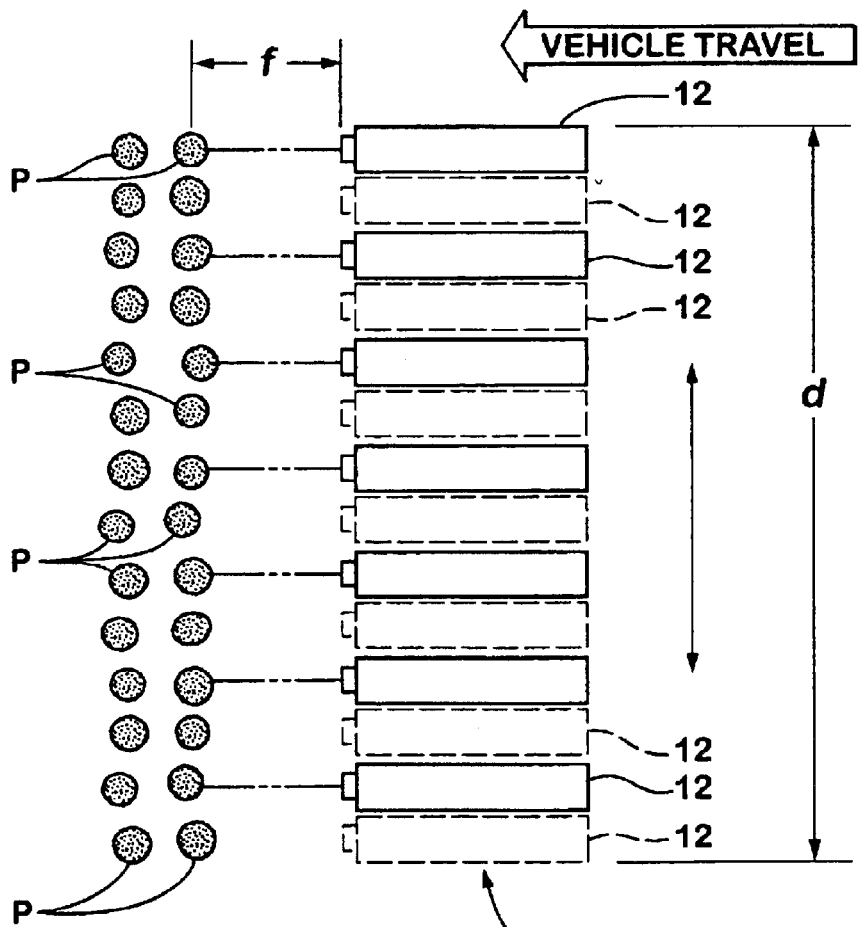
FIG. 2 is a top plan view of the combine and method in FIG. 1.

Referring now specifically to the drawings, and the illustrative embodiments depicted therein, a combine or harvester 10, according to the invention, includes a laser assembly 11 having at least one laser source 12 projecting a laser in the nature of a beam of photons "b" positioned to intersect the stalk of a plant "p" (FIGS. 1 and 2). Laser assembly 11 is supported by a vehicle 14. Vehicle 14 may be a conventional harvester of the type disclosed in U.S. Pat. No. 4,408,441, the disclosure of which is hereby incorporated herein by reference. As such, laser assembly 14 may be a retrofit kit to replace the mechanical cutters of the harvester while utilizing the propulsion system and gathering arms of the combine. Alternatively, laser assembly 11 may be supported by a vehicle 14 having pneumatic tires 18 and a lightweight frame to reduce compaction of the soil. Wheels 18 may be mounted with hydraulic lifts (not shown) and a control to keep the body of vehicle 14 level, notwithstanding variation in terrain. Pneumatic tires 18 are less likely to loosen the upper surface of the soil. Moreover, support 14 has a weight that is significantly less than that of mechanical combines. Accordingly, the tendency for tires 18 to compact the soil is significantly reduced over mechanical combines. A generator 16, which may be supported by vehicle 14, is provided to supply electrical energy to power laser assembly 11.

Preferably, assembly 11 is a plurality of lasers 12 laterally arranged in a laser, as illustrated in FIG. 2. Most preferably, the plurality of lasers is moved, such as by scanning, or the like, laterally from the solid line position illustrated in FIG. 2 to the phantom position illustrated in FIG. 2. This allows a fewer number of lasers to be utilized to cut the stalks of plants "p." In the illustrated embodiment, lasers 12 cover a cutting distance "d" laterally of the movement of support 14. Preferably, distance "d" is on the order of one foot and is, most preferably, in the range of 12 inches to 14 inches. Generator 16 is sized to supply the power requirements of lasers 12. By way of example, if eight laser assemblies are utilized, and each require 1 kilowatt of power, then generator 16 would be at least 8 kilowatts in size. In the illustrated embodiment, support 14 scans lasers 12 at a rate of on the order of one cycle per second. However, other rates may be appropriate for the application. The lasers 12 may be moved by a purely lateral motion, as illustrated in FIG. 2. Alternatively, they can be swept in a fan shape motion as would be suggested to the skilled artisan.

Laser 12 has a focal length that is less than one foot in length, and may be less than one-half of a foot in length, and may be four inches or less. This reduces the necessity for shielding around lasers 12 to protect individuals in the area in which combine 10 is operating from damage resulting from contact with beam "b," such as by the beam contacting the eyes of the individual. It is advantageous to reduce the necessity for any special shielding around laser 12 because such shield may reduce the effectiveness of its operation in cutting the stalks of plants "p."

An advantage of combine 10 is that it cauterizes the stalk, as seen in FIG. 5, in which the surface of the cut is relatively uniform and exposes channels in the stalk. This is an advantage over the cut produced by mechanical cutting of the stalk, as illustrated in FIG. 4, in which glucose may ooze from the many exposed channels CH in the cut thereby reducing the yield of sugar. Advantageously, by cauterizing the cut, the present invention facilitates the cutting of the stalk into multiple short pieces, or segments, S, as illustrated in FIG. 3, by a series of cuts C to each stalk P. Combine 10 may cut the sugarcane into lengths of less than one foot, less than one-half of a foot, and even as low as approximately four inches or less without concern from glucose weeping from each cut C. As seen in FIG. 3, the producing of multiple short pieces of stalk results in a cutting of the foliage F thereby cutting excess lengths of foliage F from the stalk. This allows the foliage to be removed at the site, such as by tumbling the stack while passing the stalk and foliage through a fluid jet, such as a jet of compressed air. An example of an apparatus that may discharge the separated excess foliage is as disclosed in U.S. Pat. No. 5,092,110, the disclosure of which is hereby incorporated herein by reference. This separates the foliage from the stalk such that the foliage may be immediately returned to the soil without being hauled to and from the processing plant. This reduces the cost of processing the foliage. Furthermore, the stalk can be more quickly processed without the necessity for a separate stalk-removing procedure at the processing plant. This further increases the yield of sugar because of the initiation of conversion of glucose to sugar begins as soon as the plant is cut. In the illustrated embodiment, combine 10 initially cuts the stalk close to the ground with the remaining cuts that divide the stalk into small pieces being performed when the stalk is supported by support 14.

In order to control the height of the initial cut "c," a height control mechanism 20 may be provided to control the height of laser assembly 11. Height control mechanism 20 is a non-contact sensor that senses distance to the soil and a control that adjusts to that level selected by an operator. Height control mechanism 20 may be a laser-based control, a camera-based control, an ultrasonic-based control, a radar-based control, a mechanical sensor, or the like, which are known in the art. By way of example, such height control mechanism may be of the type disclosed in U.S. Pat. No. 5,327,345, the disclosure of which is hereby incorporated herein by reference. Because height control mechanism 20 is capable of guiding position of laser assembly 1 without constant intervention by an operator, it is no longer necessary to burn the foliage around plants to allow an operator to view the interface between the soil and the sugarcane. This avoids the problems created by burning in the past.

Another laser assembly (not shown) may be supported by vehicle 14 in a position to cut off tops of the sugarcane stalks. This additional laser assembly may be manually controlled in vertical height by an operator, which is feasible because sugarcane stalk tops are somewhat consistent in height. However, a height control similar to mechanism 20 could also be used to control a laser assembly to cut sugarcane stalk tops.

Thus, it is seen that the present invention provides a unique combine and method of harvesting a plant having a stalk, which is more efficient at processing the stalks, as set forth above. In addition to facilitating the removal of foliage at the site, wherein the foliage can be immediately returned to the soil, the present invention produces less soil compaction and less disturbing of the top layer of the soil. This reduces the need for subsequent aeration of the soil and the likelihood that the trucks hauling the sugarcane to the processing plant will transfer loose soil from the field to the road. Furthermore, the necessity for hauling only the stalk, and not the foliage, to the processing plant reduces the number of loads that must be hauled for each unit of output. Furthermore, the need to burn foliage is advantageously removed.

The present invention makes use of commercially available lasers, which are capable of having their photon beam focused in response to an output from a control. However, the invention may also be used with a laser whose photon beam is permanently focused at a focal length "f" selected in the manner set forth above.

Although the invention is most advantageous in harvesting sugarcane, its use in other stalk-based crops, such as corn, will be apparent to those skilled in the art. Furthermore, as set forth above, the invention may be applied to other uses, such as a bush hog, or the like.

Changes and modifications in the specifically described embodiments can be carried out without departing from the principles of the invention, which is intended to be, limited only by the scope of the appended claims, as interpreted according to the principles of patent law including the doctrine of equivalents.

The embodiments of the invention in which an exclusive property or privilege is claimed are defined as follows:

1. A method of harvesting sugarcane grown in a field, the sugarcane having a stalk and foliage waste on the stalk, comprising:

generating at least one laser beam;

causing said at least one laser beam to at least momentarily come into contact with the sugarcane stalk, thereby severing the stalk and substantially cauterizing the stalk where severed; and removing the foliage waste from the stalk in the field.

2. The method of claim 1 further including scanning the laser beam across the sugarcane stalk.

3. The method of claim 2 including scanning said at least one laser beam approximately a diameter of a sugarcane stalk.

4. The method of claim 1 wherein said removing includes cutting the sugarcane stalk into a plurality of sections.

5. The method of claim 4 including flowing a fluid past the sections to assist in removing foliage waste.

6. The method of claim 5 wherein said fluid comprises air.

7. The method of claim 4 including tumbling the sections to assist removing the foliage waste.

8. The method of claim 4 including cutting the sugarcane stalk into a plurality of sections that are less than one foot in length.

9. The method of claim 8 including cutting the sugarcane into a plurality of sections that are less than one-half of a foot in length.

10. The method of claim 1 including wherein said removing includes cutting the sugarcane stalk into a plurality of sections that are less than one foot in length.

11. The method of claim 10 including cutting the sugarcane into a plurality of sections that are less than one-half of a foot in length.

12. The method of claim 1 including focusing said at least one beam at a distance of less than one foot.

13. The method of claim 12 including focusing said at least one beam at a distance that is less than or equal to four inches.

14. The method of claim 1 including maintaining a controlled distance of said at least one laser beam from ground.

15. The method of claim 14 wherein said maintaining a controlled distance includes sensing the ground with a non-contact sensor.

16. The method of claim 15 wherein said non-contact sensor comprises at least one chosen from a laser sensor, an ultrasonic sensor, a camera-based sensor, a mechanical sensor, and a radar sensor.

17. The method of claim 1 wherein said generating at least one laser beam includes providing a laser beam source.

18. The method of claim 17 wherein said positioning includes supporting the laser source with a vehicle having pneumatic tires.

19. The method of claim 17 including supporting said laser source with a vehicle having an electrical generator for powering said at least one laser source.

20. The method of claim 1 including transporting the stalks to a processing facility while retaining the foliage waste at the field.

21. A method of harvesting sugarcane grown in a field, said sugarcane having a stalk and foliage waste on the stalk, comprising:

providing a laser assembly having at least one laser source generating at least one laser beam;

positioning said laser assembly on a vehicle with said at least one laser beam directed at a base of sugarcane stalks;

operating said vehicle in a manner to cause said at least one laser beam to contact said sugarcane stalks, thereby severing the stalks at the area of contact with said at least one laser beam and substantially cauterizing said sugarcane stalks where severed; and removing the foliage waste from the stalk in the field.

22. The method of claim 21 wherein said positioning includes providing said laser assembly as a retrofit assembly and positioning said retrofit assembly on an existing vehicle.

23. The method of claim 21 including providing a laser generator at said vehicle for powering said laser assembly.

24. The method of claim 21 wherein said removing includes cutting the sugarcane into a plurality of sections.

25. The method of claim 24 including passing a fluid past the section to assist removing foliage waste.

26. The method of claim 25 wherein said fluid comprises air.

27. The method of claim 24 including tumbling the sections to assist removing the foliage waste.

28. The method of claim 24 including cutting the sugarcane into sections that are less than one foot in length.

29. The method of claim 28 including cutting the sugarcane into sections that are less than one-half of a foot in length.

30. The method of claim 21 including wherein said removing including cutting the sugarcane into section that are less than one foot in length.

31. The method of claim 30 including cutting the sugarcane into sections that are less than one-half of a foot in length.

32. The method of claim 21 including scanning said at least one laser beam across the sugarcane stalk.

33. The method of claim 32 including scanning said at least one laser beam approximately a diameter of said sugarcane stalk.

34. The method of claim 21 including maintaining a controlled distance of said at least one laser beam from the ground.

35. The method of claim 34 wherein said maintaining a controlled distance includes sensing the ground with a non-contact sensor.

36. The method of claim 35 wherein said non-contact sensor comprises at least one selected from a laser sensor, an ultrasonic sensor, a camera-based sensor, a mechanical sensor, and a radar sensor.

37. The method of claim 21 wherein said laser assembly comprises a plurality of laser sources.

38. The method of claim 37 wherein said plurality of laser sources is arranged in a width that is approximately a row of sugarcane stalks wide.

39. The method of claim 21 including transporting the stalks to a processing facility while retaining the foliage waste at the field.

* * * * *

UNITED STATES PATENT AND TRADEMARK OFFICE
CERTIFICATE OF CORRECTION

PATENT NO. : 6,834,483 B2
DATED : December 28, 2004
INVENTOR(S) : John P. Harvey It is certified that error appears in the above-identified patent and that said Letters Patent is hereby corrected as shown below:

Column 4,
Line 10, "1" should be -- 11 --.

Column 5,
Line 17, delete "including" before "wherein".

Column 6,
Line 25, delete "including" before "wherein".
Line 26, "including" should be -- includes --.
Line 26, "section" should be -- sections --.

Signed and Sealed this

Twenty-second Day of November, 2005

JON W. DUDAS
*Director of the United States Patent and Trademark Office*